March 14, 1967 R. W. DYER 3,308,711
OPTICAL SYSTEM FOR CHECKING REGISTRATION
Filed Aug. 27, 1962

INVENTOR.
RICHARD W. DYER
BY
W. M. Kain
ATTORNEY

United States Patent Office 3,308,711
Patented Mar. 14, 1967

1

3,308,711
OPTICAL SYSTEM FOR CHECKING
REGISTRATION
Richard W. Dyer, Allentown, N.J., assignor to Western
Electric Company, Incorporated, New York, N.Y., a
corporation of New York
Filed Aug. 27, 1962, Ser. No. 219,403
1 Claim. (Cl. 88—14)

This invention relates to a system for checking registration, and more particularly to an optical system for checking the registration of points on opposite sides of a workpiece.

It has long been a problem to check the registration, that is, the state of alignment, of two points on opposite sides of a workpiece, especially a workpiece of opaque material. For example, in the manufacture of printed circuit boards having circuit patterns on both sides of an opaque insulating board, it is frequently necessary to connect a circuit point on one side of the board with a circuit point on the other side by means of a rivet or eyelet which projects through the board. In such cases it is necessary to ascertain whether the points to be interconnected are in alignment so that the rivet or eyelet will contact both points.

Various techniques have been employed in checking this alignment. For example, it has been common to use reference points known to be in registration on both sides of the board as base points for systematically and laboriously measuring relative positions of other pairs of points on opposite sides of the board. Obviously, such methods are time consuming and costly.

This invention overcomes these and similar difficulties in that it permits the simultaneous visual inspection of opposite sides of the workpiece from a single viewpoint and renders possible the instantaneous checking of the registration of points thereon.

It is an object of this invention to provide an improved system for checking the registration of points on opposite sides of a workpiece.

It is a further object of this invention to provide a novel optical system which permits the simultaneous viewing of both sides of a workpiece and the checking of registration of points on the opposite sides thereof.

With these and other objects in mind, this invention contemplates a pair of aligned reticles which may, for example, be of the cross hair variety, spaced apart to define an inspection slot. Means, for example right-angle prisms, are arranged to project the image of both reticles and the areas on the workpiece immediately adjacent thereto toward a common viewpoint. The operator of this apparatus may simultaneously inspect and check the registration of two points on opposite sides of the workpiece from the common viewpoint.

Other objects and advantages of this invention will be apparent from the following detailed description when considered in conjunction with the accompanying drawings, wherein.

2

For purposes of illustration, this invention is shown and discussed in use with a workpiece 10 (FIGS. 1 and 3) which is a printed circuit board having circuitry on opposite faces thereof. It will be understood that this invention has general utility in checking registration and is not limited to application in the field of printed circuitry.

Figure 1:
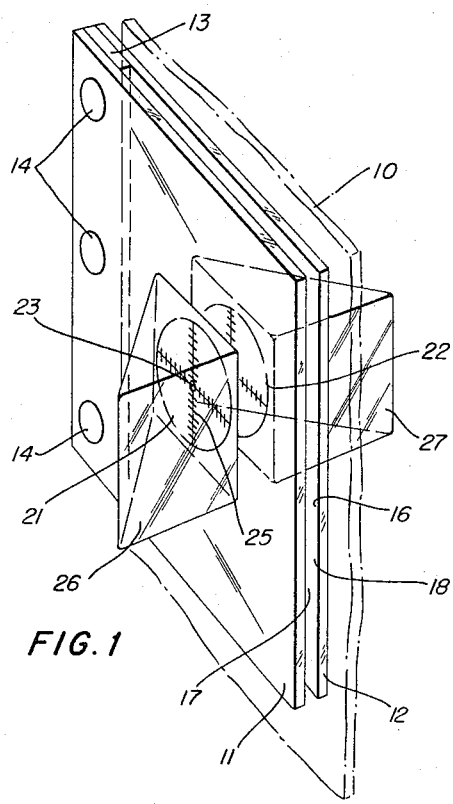
FIG. 1 is a three dimensional view of an embodiment of this invention employing right-angle prisms, in use for checking the registration of circuit points on opposite sides of a printed circuit board.
Figure 3:
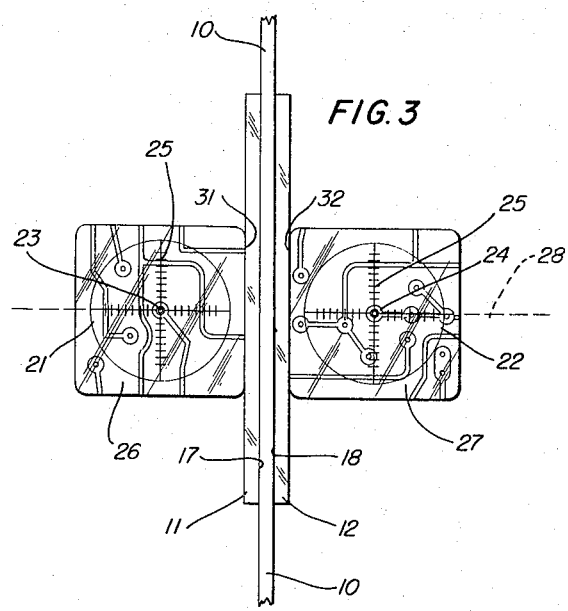
FIG. 3 is an elevation view from line 3—3 of FIG. 2 illustrating the manner in which images of opposite sides of the workpiece, with reticle images superimposed thereon, are observed from a common viewpoint.
Figure 2:
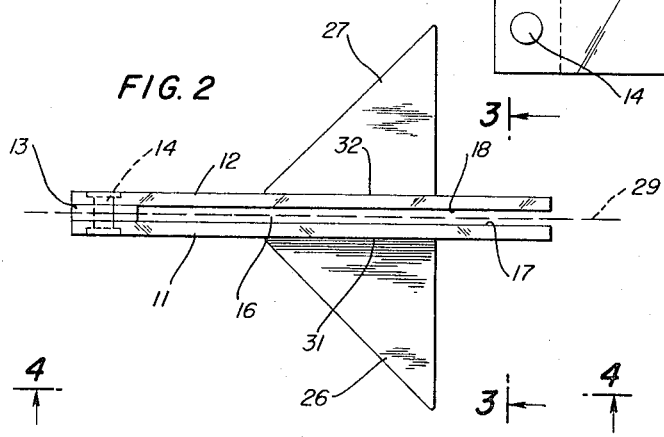
FIG. 2 is a plan view of the apparatus shown in FIG. 1 illustrating the structure of the support for, and the arrangement of, the prisms.

Referring to FIGS. 1–3, apparatus according to this invention includes a pair of transparent plates 11 and 12 which are separated by a spacer 13 having a thickness corresponding to that of the workpiece. Fasteners 14 secure the plates 11 and 12 firmly to the spacer 13 thereby eliminating any relative movement between the plates. So supported, the plates provide an inspection slot 16 defined by the inner adjacent faces 17 and 18 of plates 11 and 12, respectively. As seen in FIGS. 1 and 3, workpiece 10 may be placed within inspection slot 16.

A reticle 21 (FIGS. 1, 3 and 4) is positioned on inner face 17 of plate 11. Likewise, a reticle 22 is positioned on inner face 18 of plate 12 and in alignment with reticle 21. Reticles 21 and 22 may take the form of cross hairs, cross wires, etched or inscribed indicia on inner faces 17 and 18 and other forms as may occur to those skilled in the art to which this invention pertains. In order to prevent parallax problems, it is desirable that the reticles be positioned as closely as possible to the sides of the inspection slot 16 or otherwise arranged to prevent parallax.

As is more clearly seen in FIG. 3, the reticles 21 and 22 may be provided with sighting rings 23 and 24 and with bar graduations 25. Graduations 25 might conveniently take the form of concentric circles, the radii of which are uniformally graduated so as to provide convenient means for determining distance from the center of the reticle.

Figure 4:
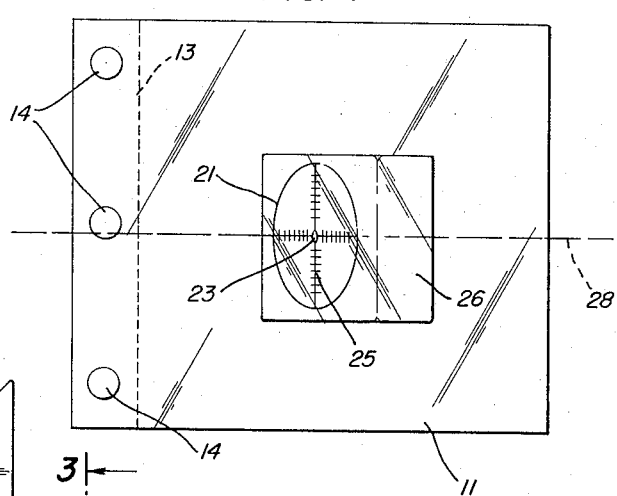
FIG. 4 is an elevation of the apparatus shown in FIGS. 1–3 as seen from line 4—4 of FIG. 2, illustrating the placement of one of the prisms.

A pair of prisms 26 and 27 are centered over reticles 21 and 22 and mounted symmetrically on plates 11 and 12, respectively. As seen in FIGS. 2–4, the prisms are symmetrical both with respect to a horizontal plane 28, and a vertical plane 29 passing through the center of slot 16. Thus, prisms 26 and 27 have both horizontal and vertical symmetry relative to the reticles and are positioned to project the images of the reticles toward a common viewpoint along plane 28.

In operation, the workpiece 10 is placed within slot 16 and the operator takes a position to have the view illustrated in FIG. 3. The operator's viewpoint should be at a comfortable working distance, but otherwise may be at any point generally along the line of intersection of planes 28 and 29.

The workpiece is manipulated so that a selected point on one side thereof falls in alignment with the center of one of the reticles, for example reticle 21. Sighting ring 23 may assist in this alignment. Prism 26 permits viewing of reticle 21 and the area of the workpiece adjacent thereto. Without moving the workpiece 10, and without moving from his viewpoint, the operator can determine the precise point on the opposite side of the workpiece in registration with the selected point. This is accomplished by viewing reticle 22 and the area on the workpiece adjacent thereto through prism 27. Sighting ring 24 may further assist in this determination.

In certain instances, it may not be necessary that two points on opposite sides of the workpiece be in exact registration. Using graduations 25, the operator may conveniently determine whether a point on one side of the workpiece is in registration with a point on the opposite side thereof within allowable tolerances. He may also determine whether points on opposite sides of the workpiece have a desired relative displacement.

Using the apparatus as described above, the operator may systematically check the registration of pairs of points on opposite sides of the workpiece by simply moving the workpiece within the slot 16.

In the above-described embodiment of the invention, transparent plates 11 and 12 provide a support for the reticles and for the prisms which project the images of the reticles. Other means of positioning the reticles and projecting their images will occur to those skilled in this art. For example, the reticles might be etched or otherwise formed on faces 31 and 32 of the prisms and the prisms appropriately supported to align the reticles and define inspection slot 16. While right-angle prisms provide a particularly convenient means for projecting the images of the reticles and portions of the workpiece thereto, mirrors and other optical elements may be substituted therefor. Where a high degree of accuracy is desired magnifying systems, even microscopic systems, may be employed in projecting these images.

It is to be understood that the above-described arrangements of apparatus and construction of elemental parts are simply illustrative of an application of the principles of this invention and many other modifications may be made without departing from the invention.

What is claimed is:

In a registration checking device,
a pair of transparent plates,
a spacer member for maintaining the plates in spaced, parallel configuration to define an inspection slot,
a pair of aligned reticles formed on the inner adjacent faces of the plates, one reticle being on either side of the slot, and
a pair of right-angle prisms mounted symmetrically over the reticles on the plates for projecting the images of both reticles and the areas within the slot immediately adjacent the reticles toward a common viewpoint.

References Cited by the Examiner

UNITED STATES PATENTS

| | | | |
|---|---|---|---|
| 2,129,130 | 9/1938 | Hammer | 88—14 |
| 2,565,074 | 8/1951 | Halahan et al. | 88—24 |
| 2,747,284 | 5/1956 | Christoph | 88—14 |
| 2,889,941 | 6/1959 | Mehlis | 88—14 |

FOREIGN PATENTS

| | | |
|---|---|---|
| 617,416 | 2/1949 | Great Britain. |
| 891,348 | 3/1962 | Great Britain. |

DAVID H. RUBIN, *Primary Examiner.*

JEWELL H. PEDERSEN, *Examiner.*

T. L. HUDSON, A. A. KASHINSKI,
*Assistant Examiners.*